June 4, 1929.　　　L. STAIGER　　　1,716,012
WING BOX
Filed Feb. 12, 1927
Fig. 1.
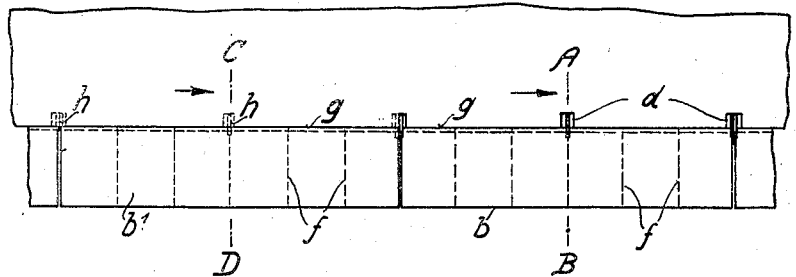
Fig. 4
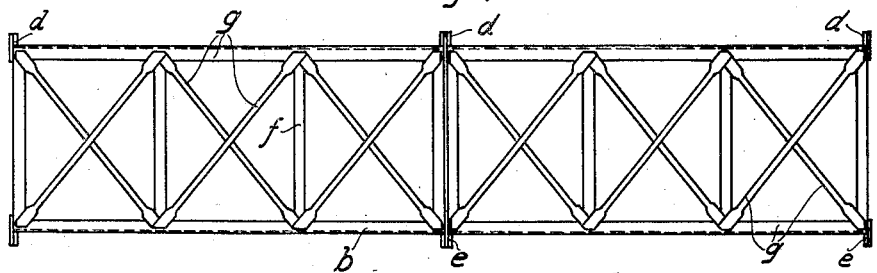
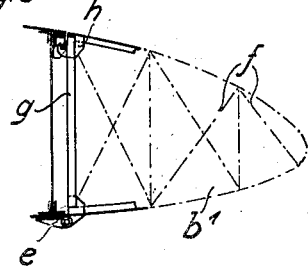
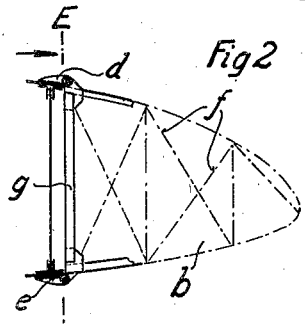
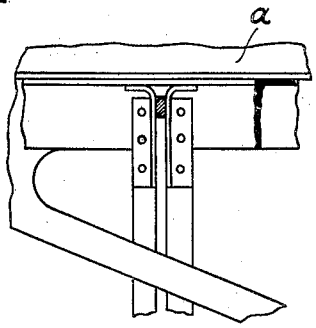
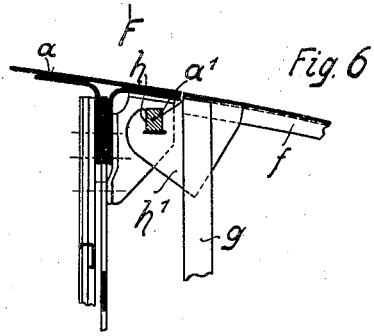
Inventor
Ludwig Staiger
By Chas. H. Keel
atty Patented June 4, 1929.

UNITED STATES PATENT OFFICE.

1,716,012

LUDWIG STAIGER, OF BIRKENWERDER, NEAR BERLIN, GERMANY, ASSIGNOR TO THE FIRM: ROHRBACH METALL-FLUGZEUGBAU G. M. B. H., OF BERLIN, GERMANY.

WING BOX.

Application filed February 12, 1927, Serial No. 167,645, and in Germany February 27, 1926.

It is an old practice to design aircraft wings with detachable nose- and rear-edges, which are subdivided into short, independent units. These latter consist of skin-covered caps, reinforced by inner trelliswork ribs in the direction of flight. The bases of said ribs serve to connect the edge parts with the main wing section.

It has been proposed with regard to above design, to use hinges and thus make the edges detachable, said hinges being arranged vertical on the inner skin. In practice the above arrangement proves unfeasible. In common use one should require a swinging range of about 180°, in order to be able to put the detached edge-parts on the main wing section, where they are solidly supported and permit of work on them and inside the main section of the wing. With the hinges being arranged inside, it would only be possible to turn down the edge parts to that degree, when a rather large gap is provided between main section and edge part, such gap being inadmissible for reasons of air flow, and rather difficult to cover up by normal means.

In practice it has been tried to arrange the vertical hinges of the rib bases on the outer surface of skin, where, on the one hand, they are not welcome owing to their impairing the air flow, but, on the other hand, have so many odds in their favor, that the resulting connections are perfectly efficient with regard to workshop and service conditions.

The present invention relates to an improvement in such connections of wing main section and edge parts, characterized by the fact that the above large gap between them is avoided, and the number of connections protruding from the supporting surface, does not come up to the number of prevailing rib bases. This is made possible by having only a few of the edge part ribs serving as connecting members, by being connected with the other ribs by means of transverse reinforcements, thus, at the same time, helping to transmit the air forces, which act on the ribs not directly connected to the wing main section. Another form of construction consists in that the connections of either top or bottom rib bases are developed as fixing fastenings consisting of trunnion block and hook and arranged inside the wing proper.

This new form of connection has some very outstanding advantages. By the reduction of outside connections the air flow is improved, thus ensuring increase of flying speed. The cross tie reinforcing the ribs, can be produced at a lower cost and with less difficulty, than the heretofore used hinges, a very material item being, that the edge part is capable to offer a most efficient resistance owing to such cross ties. In contradistinction to the old practice, little time has to be spent in flying service, in order to detach or restore the few connections for the inspection of the wing interior. The fixing fastenings do not allow to turn back the edge parts, a practice, which can not be adopted for various forms of construction, such as, for instance, trapezoidal wings a. s. o. Notwithstanding, they possess all the above mentioned advantages.

The affixed drawing shows two forms of construction of the subject matter of this invention. Fig. 1 is a plan view of a fragment of the wing main section with two short nose edge parts, Figs. 2 and 3 are sections on lines A—B, and C—D of Fig. 1, respectively, on an enlarged scale. Fig. 4 is a nose edge part seen from the plane E—F of the Fig. 2. Figs. 5 and 6 are inside connections according to Fig. 3, on an enlarged scale, in two different views.

In Fig. 1 $a$ indicates the main wing girder, whose nose edge consists of short, detachable pieces $b$, $b^1$. The short edge parts are composed of wing skin with inner reinforcing ribs $f$; the bases of said ribs, being arranged at the top or bottom of the outer skin, have been hitherto provided with vertically protruding hinges $d$ or fixing fastenings $e$, serving to ensure the connection of the edge parts and the main girder $a$. This means, that, with 7 reinforcing ribs, 14 connection points, being arranged in the free air flow, would result.

According to one form of construction of the present invention, the ribs $f$ are connected by means of a transverse trelliswork $g$, in order to convey the air forces between the individual ribs to some few connecting points. The form of construction according to Figs. 1, 2 and 4 shows three by three top and bottom outer connections, which arrangement corresponds to a reduction of the air flow impairing connecting points by 8.

Another reduction of air flow disturbance can be obtained by shifting the top and bottom connecting points into the wing interior, at the same time retaining the gapless joint of edge part and main girder $a$. Figs. 1, 3, 5 and 6 may be taken as an example of this. The short nose edge part $b^1$ is provided with a cross tie $g$, which ensures the possibility to manage with only three by three connecting points at top and bottom skin. The connections adjacent to the top skin are, however developed as fixing fastening $h$ arranged on the inner surface of the top skin. The edge part $b^1$ is provided with protruding hooks $h^1$ at its backside facing the main girder $a$, with trunnion blocks $a^1$ being attached to the main wing $a$ and well fitting, upon which blocks the hooks are slid from underneath. This sort of fastening is of easy manufacture and enables one to attain sufficient play under all conditions with sure and efficient connections, even with serial production.

With this latter form of construction only the three bottom connecting points $e$ of each edge part protrude from the wing proper. It must, however, be mentioned, that every two adjacent joints of the base gaps form, in a way, one single connection, so that practically there exist but $2 \times n + 1$ outer connecting points, with $n$ indicating the number of edge parts. The invention can also be realized in such manner, that instead of the hitherto prevailing outer connecting points fixing fastenings are provided in front of every top and bottom rib base. In contradistinction hereto the additional use of a cross tie means a distinct perfection with regard to constructional and working conditions.

The extent of such reduction of air flow disturbing connecting points is, of course, indefinite. It shall be advisable to arrange the cross tie directly adjacent to the connecting points. If necessary, said cross tie may itself serve as connecting member or support of same (hinges, hooks a. s. o.).

It is understood, that the conditions above described with regard to the connection of nose edge with main wing section, apply to the rear edge as well.

What I claim is:

1. An aerofoil for aircraft comprising a central box structure which forms the fundamental aerofoil structure, demountable edge parts fixed to this box which form a continuation of the aerofoil surface and complete the profile of the aerofoil, said edge parts forming in the fore and aft direction only comparatively short bodies and consisting of a covering skin with interior ribs as reinforcing bodies, attachment devices being provided on the edge parts at the stations of certain ribs and carried by the feet of the ribs which serve as bearers thereof, counter part attachment devices provided on the wing box, the box and the edge parts being firmly but readily detachably connected to each other in abutting relation by the attachment devices so as to form substantially continuous aerofoil surfaces, the number of attachment devices which protrude from the profile of the wing being for each edge part smaller than the number of the rib-feet.

2. An aerofoil structure of the character set forth in claim 1 wherein the attachment devices on one side are located within the profile of the wing and are constructed as a mortise-lock which consists of block and hook.

3. An aerofoil structure of the character set forth in claim 1 wherein the edge part is provided with a transverse reinforcement structure connecting the ribs of the edge part.

4. An aerofoil structure of the character set forth in claim 1 wherein the edge part is provided with a transverse reinforcement structure connecting the ribs of the edge part, said transverse reinforcement structure being substantially located in the plane of the rib feet and only a number of the ribs bearing attachment devices.

In testimony whereof, I have signed my name to this specification.

LUDWIG STAIGER.